Feb. 22, 1966  J. O. MARSH  3,236,257
SNAP ACTING RELIEF VALVE
Filed Nov. 19, 1963
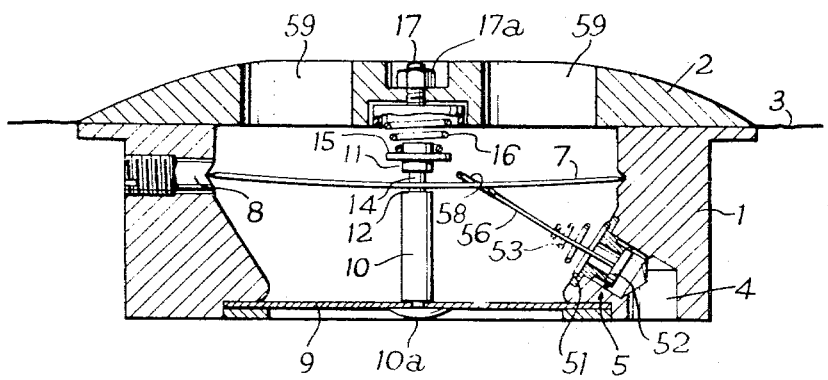
INVENTOR
JOHN OLIVER MARSH
BY
ATTORNEY

United States Patent Office 3,236,257
Patented Feb. 22, 1966

3,236,257
SNAP ACTING RELIEF VALVE
John Oliver Marsh, Chalfont St. Peter, England, assignor to Specialties Development Corporation, Belleville, N.J., a corporation of New Jersey
Filed Nov. 19, 1963, Ser. No. 324,751
4 Claims. (Cl. 137—510)

The present invention relates to relief valves, primarily intended for the relief of pressure in equipment, normally pressurized to a low super-atmospheric pressure, such as inflation bags, for example inflatable dinghies, life jackets and the like. The relief valves of the present invention may, by suitable selection of materials, also be utilised for the relief of pressure in pressure vessels.

Inflation bags, such as inflatable dinghies and life jackets are only capable of containing gas at a small positive pressure above that of the ambient atmosphere without risk of rupture. Atmospheric changes, particularly rise in temperature, can lead to dangerous increases of pressure in inflation bags and it is therefore customary to provide an inflation bag with a relief valve, which releases gas from the inflation bag when the internal pressure in the inflation bag reaches a predetermined excess over that of the ambient atmosphere.

Known types of relief valve tend to be unstable at the relief pressure and tend to permit gas to seep out without any definite opening of the valve. By contrast, it is an object of the present invention to provide for any form of pressurized equipment a relief valve which opens fully at a predetermined relief pressure and remains open until the internal pressure in the pressurized equipment has dropped to a predetermined lower pressure, at which the valve closes and cannot be again reopened until the internal pressure rises again to the original relief pressure.

According to the present invention there is provided a relief valve comprising a body adapted to be mounted in the wall of pressurized equipment, a diaphragm held in the body portion with opposite faces of said diaphragm arranged to be exposed respectively to ambient atmospheric pressure and to the internal pressure of the pressurized equipment a valve operating member secured to said diaphragm, a resilient member mounted in the valve body in a slightly bowed condition and substantially parallel with said diaphragm and engaged by said valve operating member, so as to be snapped over-center between alternative positions by action of the valve operating member, a gas outlet passage in the body portion, a tilt valve mounted in said outlet passage, an actuating member for said tilt valve and an operative connection between said actuating member and said resilient member, whereby in one of said alternative positions of the resilient member the tilt valve is caused to open by said actuating member and in the other position, the tilt valve remains closed and resilient means for applying a restoring force to the bowed resilient member after a predetermined reduction of the pressure difference across the diaphragm.

It will be appreciated that in a relief valve of the present invention when the internal pressure in, for example, an inflation bag, in which the valve is fitted, rises to a predetermined amount above the ambient atmosphere, the force exerted on the diaphragm will have the effect of compressing the restoring spring acting on the valve operating member to such an extent that the valve operating member has moved sufficiently to snap the leaf spring from the position in which the tilt valve is closed to the position in which the tilt valve is open. Gas is then released from the inflation bag through the tilt valve until the internal pressure in the inflation bag has dropped to a point at which the restoring spring can snap the leaf spring back to its original position, in which the tilt valve is maintained closed.

On construction of relief valve made in accordance with the present invention is shown in the accompanying drawing.

The relief valve comprises a body portion 1, to which is secured a cover plate 2, by means of studs (not shown). The cover plate 2 acts as a clamp for a fabric platch 3 which may be constituted by the wall of the inflation bag or which may be a separate patch to be adhesively joined to the fabric of the inflation bag. The body portion 1 is provided with a gas release passage 4 in which is provided a tilt valve 5 of conventional construction.

The tilt valve 5 consists a seating member 51, which is secured in the mouth of the passage 4, a valve member 52, which seats on a seating at the inner end of the seating member 51 and a conical spring 53, which at one end grips a shank 56, integral with the valve member 52, and at the other end bears against the outer end of the seating member 51. The spring 53 acts to hold the valve member 52 in contact with its seating. The tilt valve 5 is opened by lateral movement of the valve shank 56 which tilts the valve member 52 on its seat against the centering action of the spring 53. To effect this movement automatically the valve shank 56 is engaged by a leaf spring 7 which passes through a slot 58 in the end of the valve shank 56. The leaf spring 7 is initially slightly bowed, as shown in the drawing, the amount of the bowing depending on the setting of an adjusting screw 8 which is threaded into an aperture in the wall of the body portion 1.

The mechanical force necessary to cause movement of the leaf spring 7 between its alternative positions is supplied by means of a diaphragm 9 which carries an operating member 10 which comprises a head 10a arranged to secure the member 10 to the diaphragm 9 and a part 11 which is screw threaded into the member 10 and passes through an aperture in the leaf spring 7. The member 10 and part 11 respectively provide shoulders 12 and 14, against which the leaf spring 7 rests in its alternative positions. The part 11 is provided with an abutment 15, against which a conical compression spring 16 bears for the application of a restoring force to the valve operating member 10. The spring 16 is provided with an adjuster 17 in the form of a stud threaded into the cover plate 2 and carrying a lock nut 17a. The spring 16 has a centering action on the operating member 10.

The relief valve is shown, in the drawing in the closed position. In use, when the relief valve is mounted in the wall of an inflatable bag, increase in the pressure within the bag over the ambient atmospheric pressure exerts a force on the underside of the diaphragm 9. As this pressure increases, the operating member 10 and hence the shoulder 12 are forced against the leaf spring 7. At a predetermined pressure, which can be adjusted by means of adjuster 17 and adjusting screw 8, the spring 7 snaps over-center which brings it into contact with the shoulder 14 on part 11. The movement of the leaf spring 7 is transmitted by the valve shank 56 to the valve member 52, causing it to rock relatively to the valve seating 51 and thus causing it to be unseated.

Excess gas can then pass from the inflation bag through the passageway 4 to escape the atmospheric through vent holes 59 in the cover 2. When the pressure within the bag has fallen sufficiently the spring 16, acting in conjunction with the inherent resilience of the diaphragm 9 will cause the leaf spring 7 to return to its original position, shown in the drawing, so shutting the valve 5 and preventing any further loss of pressure.

Although the relief valve described is primarily intended for use in inflation bags, it is applicable for other purposes and the range of pressures over which a valve constructed in accordance with the present invention may be used depends upon the nature of the material from which the diaphragm is made and the loadings applied by the restoring spring 16 and the loading applied to the leaf spring 7, the loading applied to the leaf spring 7 primarily determining the difference between the relief pressure and the resealing or closure pressure.

The tilt valve may be actuated by fixing its actuating shank directly to the leaf spring 7, as shown in the accompanying drawing, or alternatively by fixing its actuating shank to a separate collar or the like, which is secured to the leaf spring. The leaf spring 7 may be replaced by a spring spider or spring disc, provided that in the latter case ample apertures are left therein to permit escape of gas. Alternatively, where a spring disc is used, an escape passage may be provided in the wall of the body to lead gas from the space between the diaphragm and the spring disc out to atmosphere.

I claim:

1. A relief valve comprising a body adapted to be mounted in the wall of pressurized equipment, a diaphragm held in the body portion with opposite faces of said diaphragm arranged to be exposed respectively to ambient atmospheric pressure and to the internal pressure of the pressurised equipment, a valve operating member secured to said diaphragm, a resilient member mounted in the valve body in a slightly bowed condition and substantially parallel with said diaphragm and engaged by said valve operating member, so as to be snapped over-center between alternative positions by action of the valve operating member, a gas outlet passage in the body portion, a tilt valve mounted in said outlet passage, an actuating member for said tilt valve and an operative connection between said actuating member and said resilient member, whereby in one of said alternative positions of the resilient member the tilt valve is caused to open by said actuating member and in the other position, the tilt valve remains closed and resilient means for applying a restoring force to the bowed resilient member after a predetermined reduction of the pressure difference across the diaphragm.

2. A relief valve as claimed in claim 1, in which said resilient member is a leaf spring mounted on a diameter of said body.

3. A relief valve as claimed in claim 2, further comprising an adjusting screw bearing against one end of said leaf spring for adjusting the bowing of said spring.

4. A relief valve as claimed in claim 2, in which said leaf spring passes through a slot in the actuating member for said tilt valve.

No references cited.

ISADOR WEIL, *Primary Examiner.*